Sept. 29, 1959 G. W. KRAEGER 2,907,025
TRIGGER SYNCHRONIZING SYSTEM FOR SEQUENTIAL
LOBING RADAR INSTALLATIONS
Filed June 3, 1955 5 Sheets-Sheet 1

INVENTOR
GORDON W. KRAEGER

BY R. J. Tompkins
ATTORNEY

INVENTOR
GORDON W. KRAEGER
ATTORNEYS

INVENTOR
GORDON W. KRAEGER

United States Patent Office 2,907,025
Patented Sept. 29, 1959

2,907,025
TRIGGER SYNCHRONIZING SYSTEM FOR SEQUENTIAL LOBING RADAR INSTALLATIONS

Gordon W. Kraeger, Linthicum Heights, Md., assignor, by mesne assignments, to the United States of America as represented by the Secretary of the Navy Application June 3, 1955, Serial No. 513,169

7 Claims. (Cl. 343—16)

This invention relates to a trigger synchronizing system for sequential lobing radar installations and more particularly to a trigger synchronizing system having an identification circuit for identifying the beginning of lobe cycles.

It is elementary that three co-ordinates are necessary to specify completely the position of any object; viz., range, azimuth, and elevation. The range from a radar station is measured by the time elapsing between the transmission of a radar pulse and the reception of a portion of that radar pulse reflected from the object of interest. The direction is generally measured by pointing the antenna in the direction that produces the greatest strength of received signal for it is then known that the object lies on the antenna axis. The accuracy of the measure of the angular position is dependent upon the width of the radar beam since a broad beam will give a reasonably constant response over a larger angle than will a narrow beam. To secure better concentration of the beam, the customary procedure is to increase the size of the antenna and to decrease the radar wave-length. As attempts are made to increase the angular precision of a system, ultimately a limit is reached beyond which it is not convenient to increase the beam concentration, for in addition to physical limitations the beam becomes so narrow that a large amount of antenna movement is necessary in order to pinpoint the object. Further increase in angular accuracy is usually obtained from a combination of beams which overlap at approximately their half power points. Two beams can be placed at a slight angle on opposite sides of the antenna axis in the horizontal or azimuthal plane, and two other beams can be similarly placed in the vertical or elevational plane. When the responses from the two azimuthal beams are equal, it is known that the object has the same azimuth bearing as the antenna axis, and similarly, when the responses from the two elevational beams are equal the elevation angle of the object and the antenna axis are equal.

Antenna systems in these tracking radar units fall into two classifications: simultaneous comparison and sequential comparison; the latter being by far the more numerous. Sequential comparison suffers, however, from an inherent disadvantage in that comparison is made between signals received in sequence. Thus, any change in signal strength during this interval of time introduces an error. Unfortunately, signal fluctuation is quite rapid for some targets, such as aircraft, so that considerable noise is introduced into the ordinary radar system.

The perfect solution to this problem is simultaneous comparison; i.e. comparison of signals received from the two directions at the same time, but the complexity of the system is of such magnitude as to make its desirability questionable. A partial solution to the same problem is an improvement in sequential comparison which will affectively reduce noise caused by signal fluctuations.

The most popular means of obtaining signals from two directions is an antenna swinging mechanically between them. In the case of a parabolic reflector, a circular movement of the feed around the focal point will produce a conically scanning beam; but mechanical limitations prevent scanning with this system at rates higher than about 60 cycles. Since fluctuations in signal strength from airplane targets contain components up to over one hundred cycles, noise is unavoidable. However, if the lobing rate, i.e. switching of antenna direction, could be increased to several hundred cycles, comparison would be made before the signal could fluctuate appreciably, and the performance of simultaneous comparisons systems would be approached.

Switching between several antennas wherein each antenna or combination of antennas provides electromagnetic propagation for only one direction and other antennas or combinations thereof are employed for the other directions accomplishes the desired result. Thus, the various lobes are obtained by a switching operation among several antennas rather than a movement of one antenna. Obviously a small switch can be moved at a higher rate than an antenna and reflector. These switching systems have produced an additional problem and that is of triggering the radar modulator at the instant that the switch is positioned for a new lobe. Also, the radar azimuth and elevation circuit must be supplied with information to enable it to identify the instantaneous position of the lobe (i.e., up, right, down or left) in order that the whole antenna array will move in the correct direction to align the antenna axis with the reflecting object.

Conceivably, the solution for this triggering problem might lie in the use of a slotted disc fastened to the shaft driving the switch. A light source and phototube with amplifier and cathode follower could generate pulses from the light passing through the slots in the disc. An extra pulse, generated by an extra slot, could be separated from the others through electronic means and then could be used to identify the beginning of a lobe cycle. This approach, however, is not practical since there would have to be vacuum tubes in the movable part of the antenna assembly which would necessitate the use of an excessively large housing. Also, calculations indicate that the pulse produced would not have a leading edge sufficiently sharp to ensure accurate triggering unless several stages of amplification and clipping were used. A solution involving a plain commutator would be out of the question since the switch speed is much too great to allow proper functioning of brushes. A reluctance pick-up comprising simply a toothed wheel attached to the same shaft driving the switch avoids the disadvantages of these other sensing systems. It is required that the teeth be so situated on the wheel that a tooth passes a reluctance system, positioned adjacent the wheel periphery, each time that a switching operation occurs. This generates an E.M.F. pulse in the reluctance system which is then shaped and fed to the modulator. The identification problem is solved by placing identification teeth following every trigger tooth that finishes a cycle.

The present invention utilizes a sensing system, which is preferably of the reluctance type, to produce pulses when a trigger for the modulator is desired. One portion of the circuit shapes the pulses so that they can provide an accurate triggering function. Another portion separates out the identification pulses that identify the beginning of lobe cycles, and these pulses are used to control a commutating gate circuit which commutates a stretched video pulse signal. These video pulses are employed to command the servo amplifier which directs the antenna motion, and thereby put the antenna on target.

Accordingly an object of the present invention is to provide a radar modulator trigger system that produces modulator triggering pulses in synchronism with the operation of a radar switching system.

Another object is the provision of a system that triggers a radar modulator in synchronism with the R.F. switching of a rotatable switch system and also generates pulses for the identification of the instantaneous position of the radar lobe.

A further object of the present invention is to provide a triggering system for a sequential lobing radar system that triggers the radar modulator simultaneously with the switching to each lobe and generates pulses which identify the beginning of lobe cycles.

Still another object of the present invention is the provision of a triggering system for a sequential lobing radar installation having a rotatable switching system that produces a radar modulator triggering pulse simultaneously with the switching of an antenna feed by the switch and generates identity pulses that control a gating circuit which in turn controls pulses employed to command the servo amplifier directing the antenna motion.

Other objects and many of the attendant advantages of this invention will be readily appreciated as the same becomes better understood by reference to the following detailed description when considered in connection with the accompanying drawings wherein.

Figure 1:
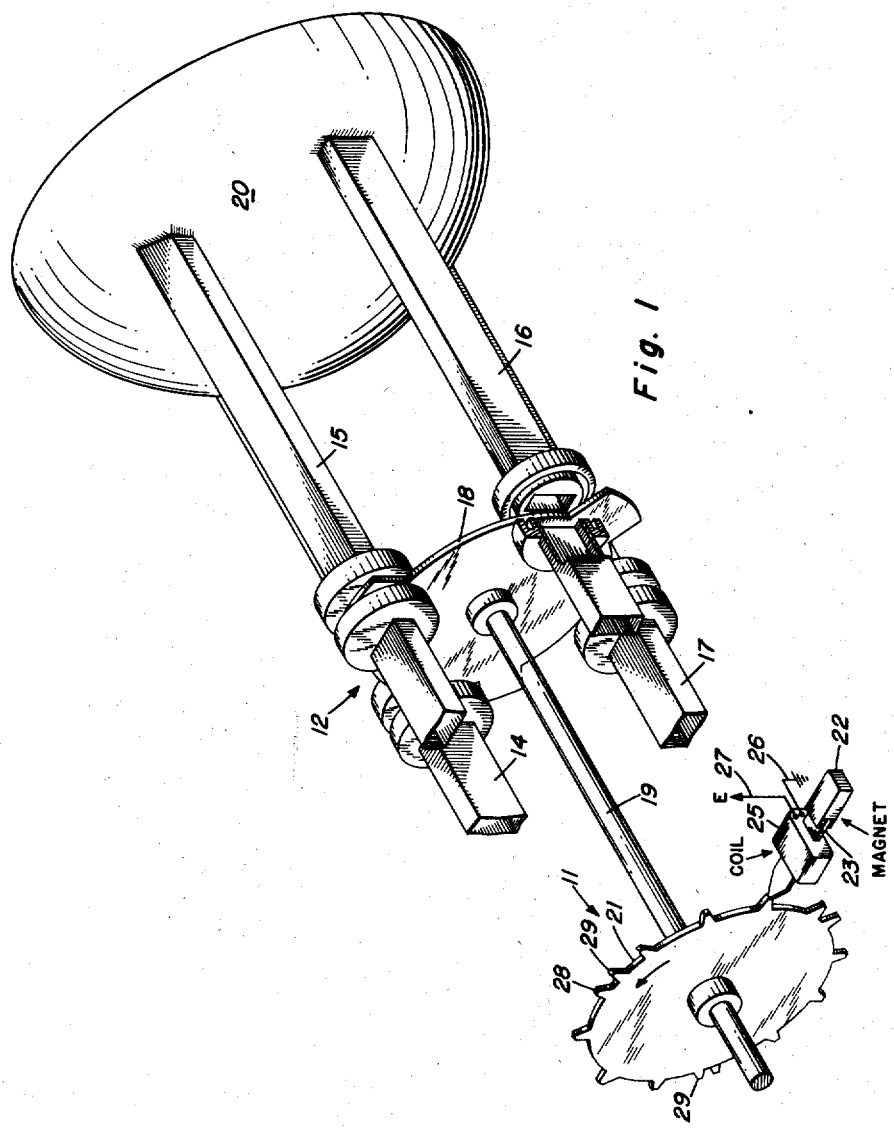
Fig. 1 shows an isometric view, partly in section, of a preferred reluctance sensing device of this invention as used with a rotatable shutter in a wave guide antenna system.

Referring now to the drawings, wherein like reference characters designate like or corresponding parts throughout the several views, there is shown in Fig. 1 (which illustrates a preferred sensing element embodiment) a reluctance sensing device 11 joined to a shutter and waveguide combination 12 that produces a lobe switching operation. Wave guide combination 12 comprises a plurality of equally spaced rectangular wave guide sections 14, 15, 16, and 17 which are terminated in a conventional manner adjacent the focus of a parabolic reflector 20 to form a wave guide antenna of the type described for example in Patent No. 2,423,072, E. O. Willoughby, Antenna System, June 24, 1947; Patent No. 2,430,568, W. D. Hershberger, Antenna System, November 11, 1947; and Patent No. 2,627,020, W. S. Parnell et al., Two Feed X Band System, January 27, 1953. Shutter 18 is rotated by shaft 19 through choke flanges provided in wave guides 14, 15, 16, and 17. Shutter 18 co-operates with wave guide combination 12 to radiate a rotating lobe in a manner which will be more fully described below. Shaft 19 is also connected to toothed wheel 21. Wheel 21 can be constructed of soft iron or other material having a high permeability. Magnet 22, which could be made of alnico or any other highly efficient permanent magnet alloy, is held in close contact with projection 23 which is formed from a piece of high permeability material. Coil 25 is wound on projection 23 and provides the output for the reluctance sensing system through leads 26 and 27. Teeth 28 of wheel 21 are correlated with the triggering operation and teeth 29 with the lobing identification.

Figure 2:
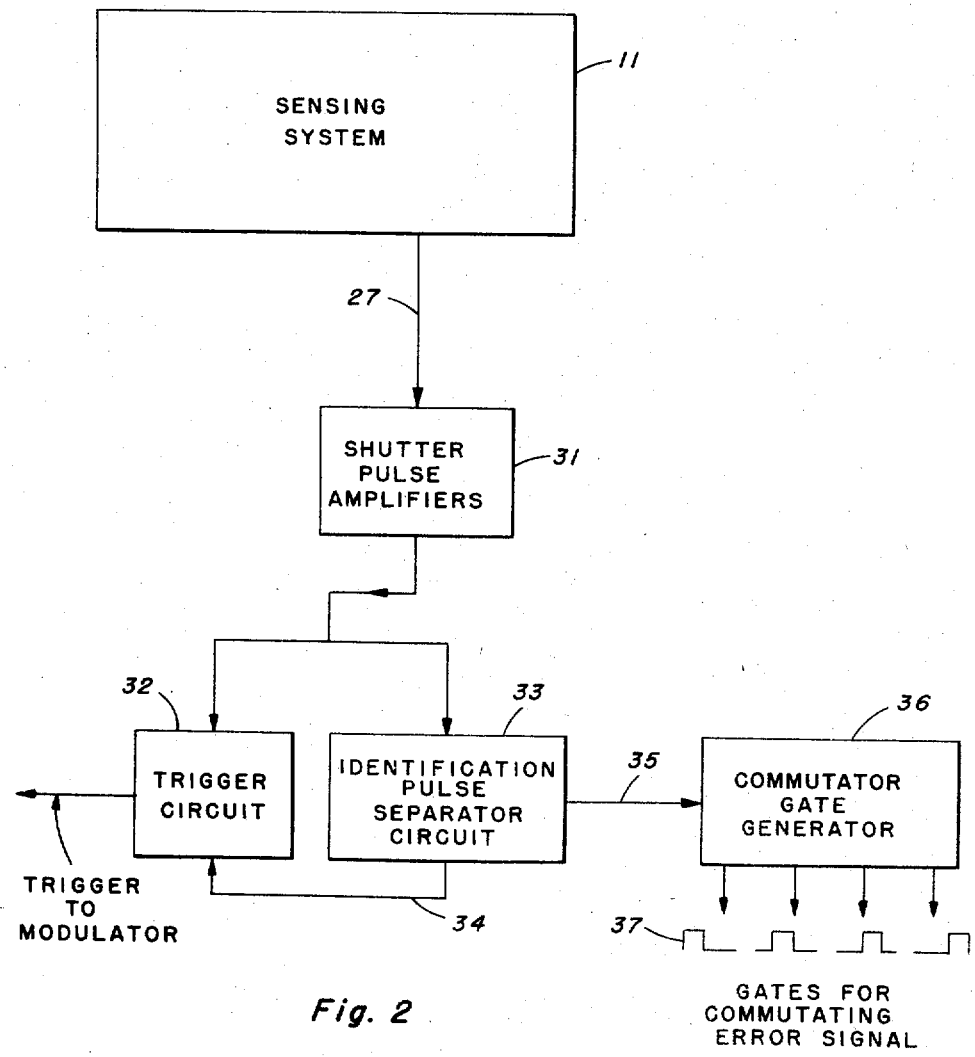
Fig. 2 illustrates a block diagram of a preferred embodiment of this invention.

In the simplified showing in Fig. 2, the output of the sensing system 11, which is preferably but not necessarily the reluctance type shown in Fig. 1, is fed by lead 27 to shutter pulse amplifiers 31 which amplify differentiate and clip the sensed waveform. The resultant shaped pulses are conducted to trigger circuit 32 and identification pulse separator 33, the latter of which separates out the identification pulses and also feeds a signal via lead 34 to the trigger circuit 32 to prevent the identification pulses from triggering the modulator. The separated identification pulses are coupled by lead 35 to commutator gate generator 36 which utilizes the pulses to maintain the correct phase relationship, between the commutator gates 37 and the position of the R.F. lobe.

Figure 3A:
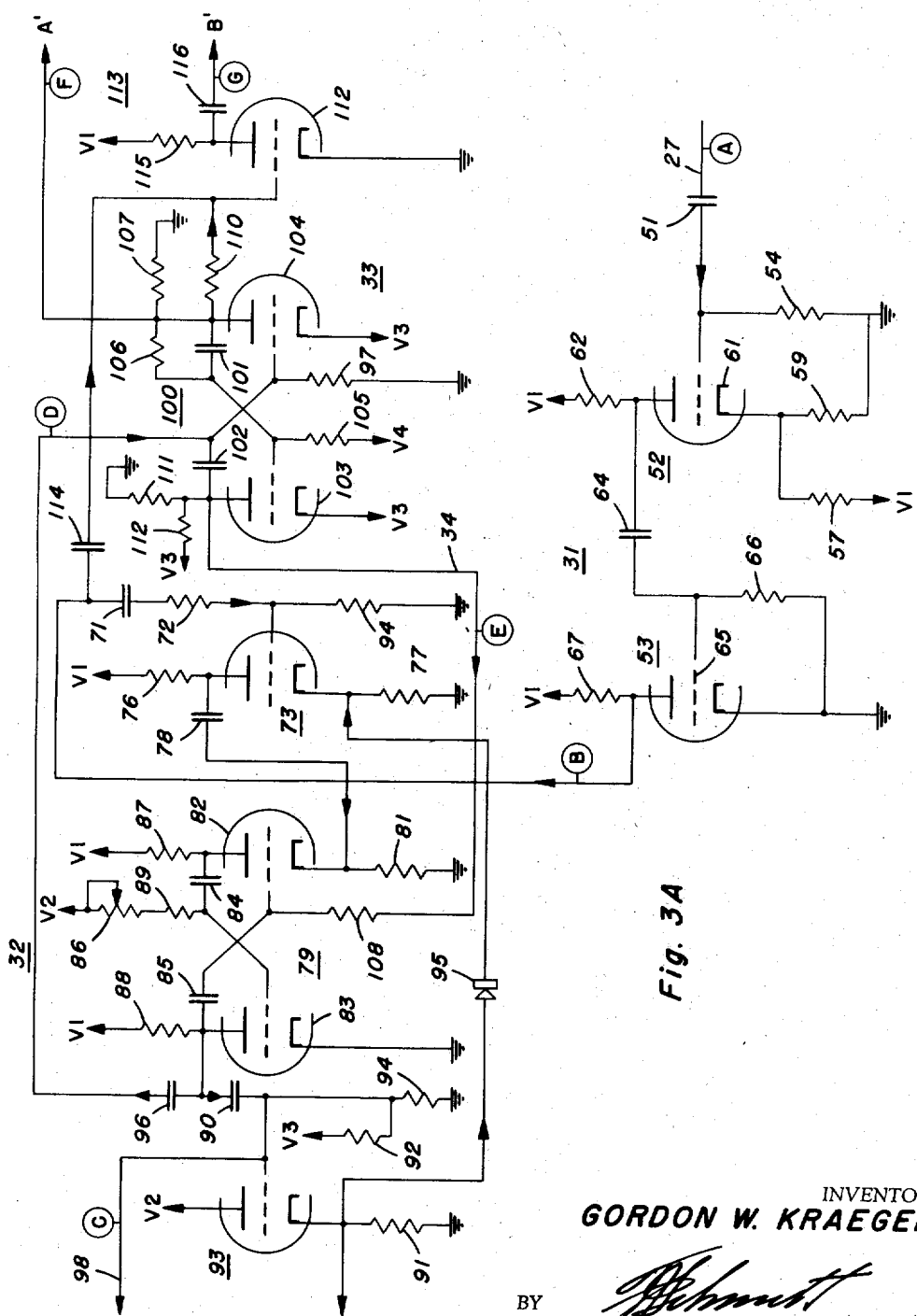
Fig. 3A shows a diagram of a circuit capable of performing the trigger circuit functions of the embodiment of Fig. 2.
Figure 3B:
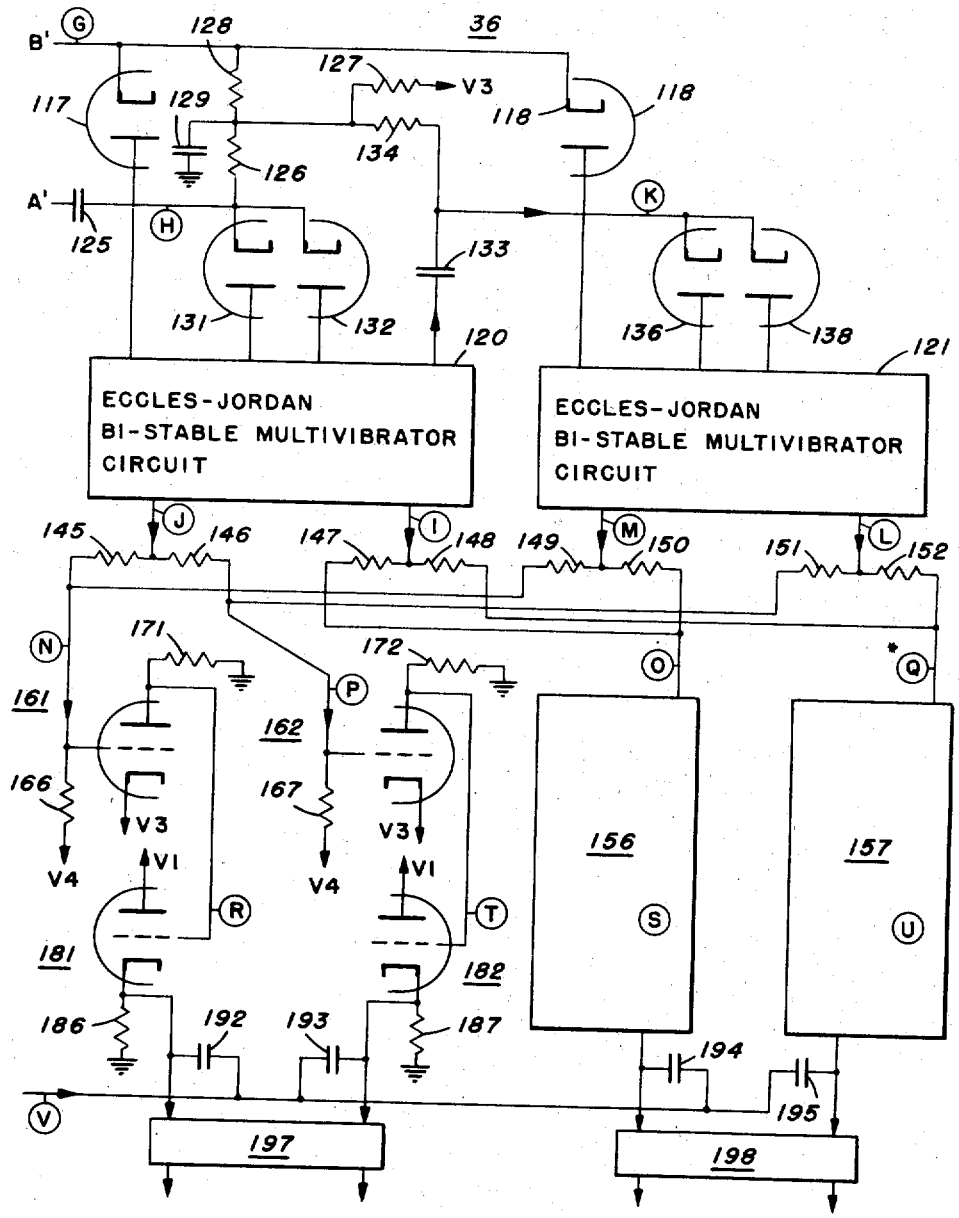
Fig. 3B illustrates a diagram of a circuit capable of performing the identification pulse separation and commutating gate functions of the embodiment of Fig. 2.
Figure 4:
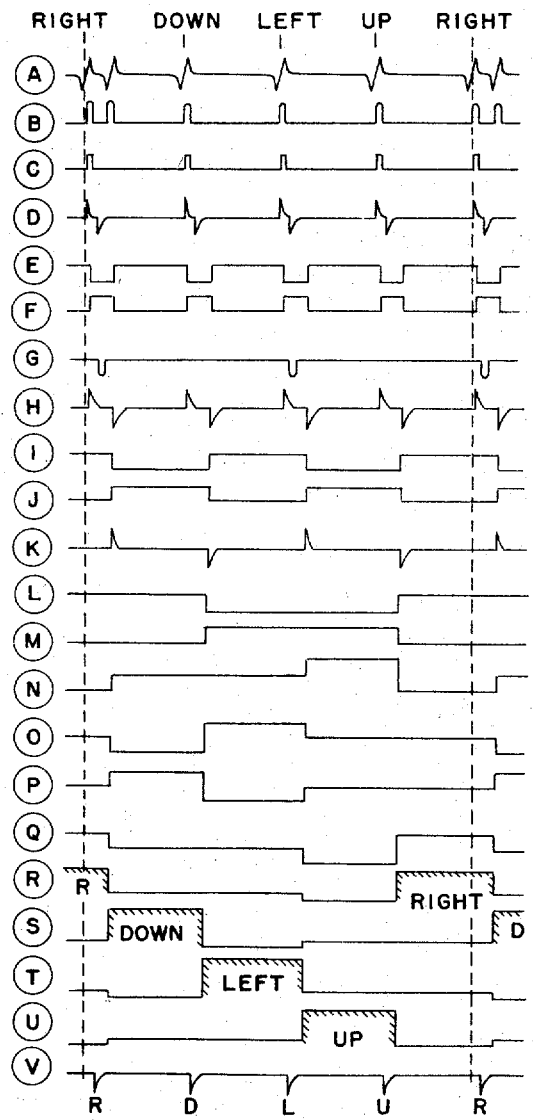
Fig. 4 shows the various waveforms occurring in the circuits of Figs. 3A and 3B.

Attention is now directed to Figs. 3A, and 3B in which there are presented the details of a circuit capable of performing the broad functions indicated in Fig. 2. Fig. 4 should be read in conjunction with Figs. 3A and 3B, since the former illustrates the various waveforms produced by the circuit components of Figs. 3A and 3B. In Fig. 3A an output waveform A is produced by the sensing element (not shown) and is coupled by capacitor 51 to the input of shutter pulse amplifiers 52 and 53. In amplifier 52, resistor 54 provides a leak path for the grid and resistors 57 and 59 form a voltage divider which places a slight positive voltage from source $V_1$ on the cathode. Plate resistor 62 is quite large thus making any degenerative feedback from resistor 59 inconsequential, hence the cathode is maintained at approximately a constant positive potential and thus clips the positive peaks of waveform A. Coupling capacitor 64 and resistor 66 differentiate the clipped output of 52 and feed it into amplifier 53. Amplifier 53 clips off the previously unclipped portion of waveform A and amplifies the previously clipped portion to form waveform B which is taken from one end of plate resistor 67. Waveform B is joined by capacitor 71 and resistor 72 to the grid resistor 74 of trigger injector 73 which amplifies and inverts the input. The resultant is fed from plate resistor 76 through capacitor 78 to cathode resistor 81 which is the normally cut-off side of blanking multivibrator 79. Capacitors 84 and 85 interconnect the plates and grids of tubes 82 and 83 in typical multivibrator fashion and resistors 87 and 88 serve as plate resistors. Resistor 89 and variable resistor 86 connect the grid of tube 83 to a source of positive potential $V_2$ and thereby control the blanking pulse width. Blanking multivibrator output waveform C is conducted through capacitor 90 to the terminal between voltage dividing resistors 92 and 94. The voltage at this terminal provides a pulse through lead 98 for blanking the video channel for the first few microseconds after the "main bang" and also provides an input for cathode follower 93. The cathode follower output is taken from resistor 91 in the conventional manner and is employed to trigger the radar modulator unit and also to feed back a voltage through rectifier 95 to resistor 77 of trigger injector 73. A portion of waveform C is differentiated by capacitor 96 and grid resistor 97 and the obtained waveform D is fed to the grid of the normally conducting side of the identification multivibrator 100 (ID multivibrator). Capacitors 101 and 102 interconnect the plates and grids of tubes 103 and 104 in multivibrator fashion. The cathodes are joined to a source of negative voltage $V_3$ and the plates to the centertaps of voltage dividing resistors 106, 107 and 111, 112. A large source of negative voltage $V_4$ is coupled through resistor 105 to the grid of tube 103. One output, waveform E, of ID multivibrator 100 is coupled by lead 34 through resistor 108 to the grid of tube 82. Resistor 110 feeds a gating pulse to the grid of identification pulse separator 113, in which tube 112 amplifies an identification pulse received from capacitor 114. This amplified signal G is taken from one end of plate resistor 115 and coupled by capacitor 116 to the cathode of trigger diode 117 of bistable multivibrator 120 and to the cathode of trigger diode 118 of bi-stable multivibrator 121 (Fig. 3B). Another portion of the output of ID multivibrator 100 is differentiated by capacitor 125 and associated resistors 126 and 127 to produce waveform H which triggers diodes 131 and 132. These resistors together with resistor 128 and capacitor 129 also provide a filter circuit. The circuit details of bi-stable multivibrators 120 and 121 have not been shown as these Eccles-Jordan circuits are widely known and have input and output connections that are readily apparent to one skilled in the art. This lack of a specific showing should not be construed as indicating that the other circuit components that are shown in detail are not conventional and that the invention requires these specific circuits. It should be obvious to one skilled in the art that there are many circuits other than those shown that are capable of producing the desired waveforms. Continuing, one output of multivibrator 120 is differentiated by capacitor 133 and resistors 134 and 127 and the resulting waveform K is conducted to trigger diodes 136 and 138. Since the frequency of triggering waveform H is twice that of triggering waveform K, multivibrator 120 runs at twice the frequency of multivibrator 121. The output waveforms J, I, L and M are added together in the network composed of resistors 145–152 inclusive. The resulting waveforms N, P, O, and Q are fed respectively to right gate amplifier 161, left gate amplifier 162, down gate amplifier 156, and up gate amplifier 157. These amplifiers are identical and thus only two are shown and these have grid resistors 166 and 167 and plate resistors 171 and 172. The obtained waveforms R, T, S, and U are conducted to identical cathode followers of which only two, 181 and 182 are shown. The stretched video pulse input V is coupled to the cathode follower resistors by capacitors 192–195 inclusive and upon a proper gate are conducted to the azimuth channel differential amplifier 197 which controls the azimuthal directional movement of an antenna servo amplifier and to an elevational channel differential amplifier 198 which controls the elevational movement of an antenna servo amplifier.

The lobe switching operation of the shutter and waveguide combination of Fig. 1 is obtained through the sequential blocking of waveguides 14, 15, 16, and 17, one at a time. The output beam, which is a composite of the outputs of the three non-blocked feeds, is lobed from the antenna axis in a direction which is either up, right, down, or left depending upon which of the four R.F. feeds is being blocked. Thus, for each complete cycle of rotatable shutter 18, there are three complete lobe switching cycles, each of which involves four positions; viz., up, right, down, and left. Therefore the radar magnetron must be triggered twelve times for each complete rotation of shaft 19. Twelve trigger teeth 28 are situated equidistantally along the circumference wheel 21 in such a fashion that one of these teeth is directly adjacent projection 23 when a waveguide is being blocked. The proximity of the adjacent tooth lowers the reluctance of the path through projection 23 thus increasing the lines of flux. The change of the number of lines of flux through projection 23 induces a voltage in coil 25 which is fed by lead 27 to the triggering and pulse identification circuits shown in Figs. 3A and 3B. An identification tooth 29 closely follows every fourth triggering tooth 28 and induces a voltage in coil 25 in similar fashion.

In Fig. 3A the shutter pulse amplifiers 52 and 53 amplify, clip, and differentiate the pulses produced by the sensing element. The resulting waveform B, which consists of pulses having a positive polarity, are given additional amplification by trigger injector 73 and emerge from the injector as negative pulses. These negative pulses are fed to the cathode of the normally cut-off side of the blanking multivibrator 79. The pulses, except for the identification pulses, cause the blanking multivibrator to be triggered. The reason for the identification pulse exception will be seen later. The blanking multivibrator output is a positive pulse, waveform C, which triggers the modulator, and also is used to blank the video channel for the first few microseconds after the "main bang." A portion of the blanking multivibrator output is differentiated to produce waveform D and the negative spike in this waveform is fed to the grid of the normally conducting side of the identification pulse multivibrator 100. This triggers the ID multivibrator and a negative pulse is produced which has a width equal approximately to twice the time separation between every fourth trigger pulse and its associated identification pulse. This negative pulse is fed to the grid of the normally cut-off side of the blanking multivibrator 79. During the period of this negative pulse, an identification pulse will attempt to trigger the blanking multivibrator but will be prevented from doing so by this negative pulse which holds that side of the blanking multivibrator in a cut-off state. The ID multivibrator 100 also feeds a positive polarity pulse, waveform F, to the grid of ID pulse separator 113. This positive gate permits only the identification pulse coming from the shutter pulse amplifiers 52 and 53 to be amplified by tube 112. The identification pulses are thus separated from the remainder of the pulse train and are seen as waveform G. The negative spike of waveform H, the latter being the result of differentiating waveform F, triggers the Eccles-Jordan bi-stable multivibrator circuit 120 which in turn triggers bi-stable multivibrator 121 (Fig. 3B). Waveform G which is fed to both multivibrators 120 and 121, ensures that these two multivibrators are in the proper state at the beginning of the lobe cycle, otherwise it would be possible for the commutating gate circuit to gate, for instance, a down video pulse when it should be gating a left video pulse. The outputs J, I, M, and L, of these multivibrators are added together in the resistor network composed of resistors 145 through 152 inclusive to produce waveforms N, P, O, and Q. These resulting waveforms are amplified in circuits 161, 162, 156, and 157, to produce four gates (R, T, S, and U), which form four gates that commutate the stretched video pulses V. These gate pulses are employed to command the servo amplifier that directs the antenna motion.

A circuit has been disclosed for use with a sequential lobing radar system. Triggering pulses are produced simultaneously with the switching operation and are used to trigger the radar modulator. After every lobing cycle, identification pulses are produced and are separated out to control a gating circuit which in turn controls the pulses employed to command the servo amplifier that directs the antenna motion. This circuit ensures the triggering of the radar modulator at the proper times and also eliminates error that might result from abiguity in lobe identification. Following is a listing of values of the circuit components of Figs. 3A and 3B, the employment of which will yield an operable circuit. This is merely an exemplary showing as the values of the components are not limited thereto.

| Component | Value |
| --- | --- |
| Resistors: | Ohms |
| 62, 74, 97 | 1 Meg. |
| 54, 91 | 3.9K |
| 59 | 2.7K |
| 57 | 180K |
| 66, 72 | 68K |
| 67, 107, 111 | 27K |
| 76 | 22K |
| 77 | 470 |
| 81 | 1.5K |
| 87, 88, 115 | 10K |
| 114 | 47K |
| 86 | 250K |
| 89 | 220K |
| 92 | 470K |
| 94, 110, 126, 134, 128 | 100K |
| 105 | 680K |
| 112, 106 | 150K |
| 127 | 330K |
| 145, 146, 147, 148, 149, 150, 151, 152, 171, 172 | 56K |
| 166, 167 | 1.5 Meg. |
| 186, 187 | 3.3 Meg. |
| Capacitors: | Micro-Micro Farads |
| 51, 71, 129 | 10,000 |
| 64 | 1,000 |
| 78 | 250,000 |
| 84 | 56 |
| 85 | 390 |
| 90, 102 | 470 |
| 96 | 10 |
| 114 | 560 |
| 101 | 100 |
| 116 | 47 |
| 192, 193, 194, 195 | 18,000 |

| Component | Value |
| --- | --- |
| Tubes: | |
| 53, 161, 162 | 12AX7 |
| 53, 73, 82, 83, 93, 103, 104, 181, 182 | 5814 |
| 117, 118, 131, 132, 136, 138 | 5726 |
| Voltages: | |
| V$_1$ | +150 |
| V$_2$ | +300 |
| V$_3$ | −150 |
| V$_4$ | −500 |

Obviously many modifications and variations of the present invention are possible in the light of the above teachings. It is therefore to be understood that within the scope of the appended claims the invention may be practiced otherwise than as specifically described.

What is claimed is:

1. In a sequential lobing radar installation antenna means provided with a rotating lobing switch for producing a change in orientation in lobes radiated from said antenna means, means attached to the rotating lobing switch for producing trigger pulses in synchronism with the switching operation for triggering the radar modulator, means attached to the rotating lobing switch for producing identity pulses at the beginning of each lobing cycle for identifying the beginning of the lobing cycle, amplifier means, means under the control of said identity pulses and said trigger pulses for forming input gates to said amplifier means that are synchronized with the operation of said lobing switch, and means to apply echo pulses to said amplifier.

2. In a sequential lobing radar installation antenna means provided with a rotating lobing switch for producing a change in the orientation of the lobes radiated from said antenna means, a pulse producing circuit for producing a stretched video pulse for each lobe the magnitude of which is a function of the magnitude of an echo pulse received from the lobe, means attached to the rotating lobing switch for producing trigger pulses in synchronism with a switching operation to a new lobe for triggering the radar modulator, means attached to the rotating lobing switch for producing identity pulses at the beginning of each lobing cycle for identifying the beginning of the lobing cycle, amplifier means for producing signals to control the movement of the radar antenna assembly as a function of the magnitude of input video pulses, means triggered by each one of said identity pulses and said trigger pulses for producing gating signals equal in number to the number of lobes in a lobing cycle and synchronized therewith, and leads conducting said stretched video pulses and said gating signals to the input to said amplifier means whereby said video pulses are gated to produce said control signals.

3. In a sequential lobing radar installation antenna means provided with a rotating lobing switch for producing a change in the orientation of the lobes radiated from said antenna means, a pulse producing circuit for producing a stretched video pulse for each lobe, the magnitude of each video pulse being a function of the magnitude of the echo pulse received from the corresponding lobe, means affixed to said rotating lobing switch for producing trigger pulses in synchronism with each switch operation to a new lobe and identity pulses at the beginning of each lobing cycle, means for separating said trigger pulses and said identity pulses, means for conducting said trigger pulses to the radar modulator for causing said modulator to be triggered at the instant that each lobe is initiated, amplifier means having an input corresponding to each lobe for providing control signals that are a function of the difference in magnitudes of input video pulses received respectively on the two inputs corresponding to two lobes in the same plane, means triggered by each one of said identity pulses and said trigger pulses for producing sequential gating signals of the same width and equal in number to the number of lobes in a lobing cycle, leads conducting said stretched video pulses to all of the amplifier inputs, and leads conducting each of said gating signals such that each gating signal occurs during the lobe that corresponds to the input to which each is connected whereby said stretched video pulses are gated by said gating pulses.

4. In a sequential lobing radar installation having a pulse producing circuit for producing a stretched video pulse for each lobe, the magnitudes of all video pulses being the same function of the magnitudes of the echo pulses received from their corresponding lobes, means for producing a trigger pulse at the instant of initiation of each lobe; means for producing an identity pulse at the beginning of each lobing cycle for identifying the beginning of the lobing cycle; means for shaping the trigger pulses whereby the trigger pulses can affectively trigger the radar modulator at the instant of initiation of each lobe; amplifier means having inputs, each of which corresponds to a different lobe, for producing control signals which are a function of the difference in magnitudes of input video pulses received respectively on the two inputs corresponding to two lobes in the same plane; means triggered by each one of the identity pulses and said trigger pulses for producing sequential gating signals of the same width and equal in number to the number of lobes in a lobing cycle; leads conducting said stretched video pulses to all of the inputs of the amplifier means; and leads conducting each of said gating signals to one of said amplifier inputs such that each gating signal occurs during the lobe period of the lobe that corresponds to the input to which each gating signal is connected whereby said stretched video pulses are gated by said gating pulses.

5. A sensing system for a sequential lobing radar installation having a rotating switch for producing the change in lobes, said sensing system comprising: a wheel of low reluctance material affixed to rotate with the switch, a magnet, a projection of low reluctance material attached to one magnet pole and situated adjacent the circumference of said wheel, a coil wound around said projection and having two output terminals, teeth arranged on the circumference of said wheel such that a tooth will be directly opposite said projection at the instant of initiation of a new lobe and also at a slight time after the initiation of the lobe that commences a new lobing cycle whereby voltage pulses are induced in said coil and appear across said two output terminals whenever a lobe is initiated and also when a new lobing cycle is started.

6. In a sequential lobing radar installation having antenna means provided with a lobing switch of the waveguide shutter type, a pulse producing circuit for producing a stretched video pulse for each lobe, the magnitudes of all video pulses being equal to the same function of the magnitudes of the echo pulses received from the corresponding lobes, and having amplifier means provided with a plurality of inputs, each of which corresponds to a different lobe to provide control signals that are a function of the difference in magnitudes of input video pulses received on the two inputs corresponding to two lobes in the same plane, a trigger synchronizing system comprising: means for producing a trigger pulse at the instant of initiation of each lobe and an identity pulse slightly after the beginning of each lobing cycle, electronic means for clipping differentiating and amplifying the identity and trigger pulses, means for converting these trigger and identity pulses into negative pulses, a monostable multivibrator for producing a square wave pulse of adjustable width, leads for conducting said negative pulses to the cathode of the normally cut-off side of said monostable multivibrator for triggering said monostable multivibrator, leads for conducting the output of said monostable multivibrator to terminals to which the input to the radar modulator can also be connected, a second monostable multivibrator having a period which is greater than the separation between the trigger pulse that initiates a lobing cycle and the identity pulse that immediately follows it, means for differentiating a portion of the output of said first monostable multivibrator and for conducting the resulting waveform to trigger the second monostable multivibrator, leads conducting the negative output of said second monostable multivibrator to the grid of the normally cut-off side of said first monostable multivibrator for maintaining that side cut-off during the period of the negative wave, an amplifying circuit having an electron tube, leads for conducting a portion of output of said electronic means and the positive output of said second monostable multivibrator to the grid of the electron tube of said amplifying circuit whereby only the identity pulses appear in the output of said amplifying circuit, a first bi-stable multivibrator, a second bi-stable multivibrator, means for conducting the output of said amplifying circuit to trigger said first and second bi-stable multivibrators, means for differentiating the positive output of said second monostable multivibrator and employing the resulting negative spike thereof to trigger said first bi-stable multivibrator, means for differentiating a portion of the output of said first bi-stable multivibrator and conducting the resulting negative spike thereof to trigger said second bi-stable multivibrator whereby said second bi-stable multivibrator has a frequency half that of said first bi-stable multivibrator, means for adding the four outputs of said first and second bi-stable multivibrators to obtain four sequential gates which are of equal width and which correspond in phase to each of four lobes respectively of the lobing cycle, leads for conducting said stretched video pulses to all of the amplifier inputs, and leads conducting each of said gating signals to one of said amplifier inputs such that each gating signal occurs during the lobe period of the lobe that corresponds to the input to which each gating signal is connected whereby said stretched video pulses are gated by said gating pulses to produce said control signals.

7. The combination of claim 6 wherein said means to produce said trigger pulses and said identity pulses comprises: a wheel of low reluctance material affixed to rotate with the switch, a magnet, a projection of low reluctance material attached to one magnet pole and situated adjacent the circumference of said wheel, a coil wound around said projection and having two output terminals, teeth arranged on the circumference of said wheel such that a tooth will be directly opposite said projection at the instant of initiation of a new lobe and also at a slight time after the initiation of the lobe that commences a new lobing cycle whereby voltage pulses are induced in said coil and appear across said two output terminals whenever a lobe is initiated and also when a new lobing cycle is started.

References Cited in the file of this patent

UNITED STATES PATENTS

| | | |
|---|---|---|
| 2,405,930 | Goldberg | Aug. 13, 1946 |
| 2,422,334 | Bedford | June 17, 1947 |